Figure 1:
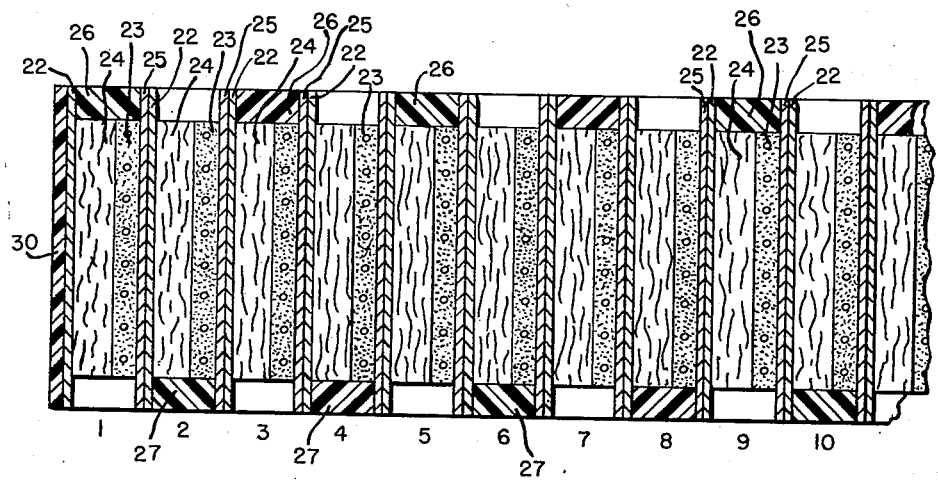

July 27, 1954  N. T. WILBURN  2,684,988

DEFERRED ACTION PILE TYPE BATTERY

Filed March 31, 1953

INVENTOR.
NICHOLAS T. WILBURN
BY
Harry M. Saragoritz
Attorney

Patented July 27, 1954

2,684,988

UNITED STATES PATENT OFFICE 2,684,988

DEFERRED ACTION PILE TYPE BATTERY

Nicholas T. Wilburn, Wanamassa, N. J., assignor to the United States of America as represented by the Secretary of the Army Application March 31, 1953, Serial No. 346,056

1 Claim. (Cl. 136—90)

(Granted under Title 35, U. S. Code (1952), sec. 266)

The invention described herein may be manufactured and used by or for the Government for governmental purposes without the payment of any royalty thereon.

This invention relates to dunk-pile type batteries using various electrochemical systems such as the system magnesium-cuprous chloride-water or zinc-silver peroxide-potassium hydroxide or cadmium (lead, zinc)-lead peroxide-sulphuric acid.

Lightweight, deferred action batteries of the pile type adapted for quick activation by dunking into a liquid electrolyte have attained considerable importance as "meteorological" or "one-shot" batteries. Such dunk-pile type batteries consist of a pile of flat cell units separated by thin liquid-tight intercell walls that electrically connect the positive electrode of one cell with the negative electrode of the neighboring cell. The pile of flat cells is aligned in a frame or hull that peripherally surrounds the pile assembly holding the cells together while leaving top and bottom of the cells open, or at least partly open. Such a battery is activated by "dunking" that is by immersing the same for a short time in a liquid electrolyte.

Considerable electrical losses are caused in such dunk-pile type batteries by the creepage of the electrolyte from one cell over the thin liquid-tight intercell wall into the neighboring cell. The electrolyte that creeps over the intercell walls forms a continuous conductive path and leakage current will follow this path from one cell to another.

It is an object of this invention to markedly decrease the creeping of electrolyte by spatial alternation of cell openings which force the electrolyte to creep at least over the width of one complete cell rather than from one cell over the thin intercell wall only, into the neighboring cell. The new structure according to the invention may either prevent the forming of a continuous conductive path or if a path is formed by creeping electrolyte its resistance will be very high due to its markedly increased length.

These and other objects will become more apparent from the following description and accompanying illustration of specific embodiments of the inventive idea.

Figure 2:
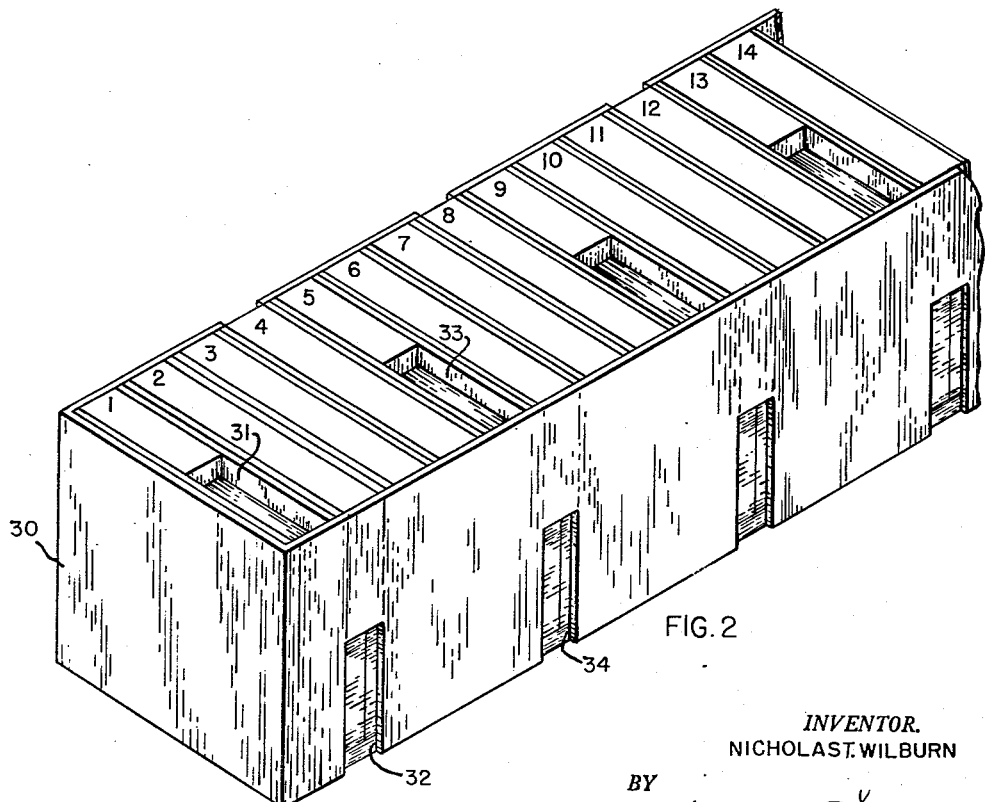

In the drawings:

Fig. 1 is a vertical cross-section thru a dunk-pile type battery according to the invention, broken off at one end, and Fig. 2 is a perspective view of a modified form of such a battery.

The batteries illustrated in the drawings are typical dunk-pile type batteries using the electrochemical system zinc-silver peroxide-potassium hydroxide. Such batteries consist in known manner of a plurality of thin, flat cells 1, 2, 3, 4, etc. assembled in a pile.

The pile type battery shown in Fig. 1 is greatly enlarged for the purpose of clearness. Each cell consists of a negative zinc-electrode 22, a positive silver peroxide carrying electrode 23 and a spacer 24 of bibulous electrolyte retaining material. A magnesium plate 25 separates cell 1 from the neighboring cell 2. The negative electrode 22 of cell 2 is in direct intimate contact with the magnesium plate 25 of cell 1. The neighboring cell 2 consists of course of the same elements as cell 1; the positive electrode 23 of cell 2 contacts another magnesium plate 25 which in turn is in direct immediate contact with the negative electrode 22 of cell 3, and so forth.

The separating plate 25 may consist of any conducting and liquid-tight material other than magnesium provided such material does not interfere with the function of the cell. In other words, the material must be impermeable to the electrolyte used, it must be a good electrical conductor and must not be effected by the chemical and electrochemical reactions that are going on in the cell. To reduce the electrical resistance between the magnesium plate 25 and the negative electrode 22 the contact betwee these two sheets should take place upon the whole surface. Satisfactory contact may be achieved by tack welding, sewing, etc. or by electrolytically depositing one metal upon the other so as to produce a unitary bi-metallic plate.

The spacer 24 conventionally consists of paper, wood pulp, microporous rubber, glass wool, rayon felt, webril, or other liquid-retaining inert materials. The thickness of the spacer 24 is designed to soak up enough electrolyte to allow complete utilization of the active materials of the electrodes. If, for instance, electrodes of about 1 square inch are used for constructing a meteorological battery of conventional design the magnesium plate 25 will have a thickness of about .006" and the separator 24 a thickness of about 0.075".

The assembled pile type battery is held together by means of a frame 30 consisting in known manner of thin, flexible dielectric material such as polystyrene or other insulating plastics such as polyvinyl resins, cellulose acetate, etc. Conventional terminals (not shown in the drawings) are connected with the negative electrode of the first cell and the positive electrode of the last cell.

Top and bottom of this pile type battery is either left open or only partly sealed so as to allow the entrance of the electrolyte and the escape of air while the electrolyte is entering the cells during dunking. In the example chosen for illustration potassium hydroxide is used as the electrolyte. Most electrolytes, and particularly the alkaline electrolytes, have a tendency to creep over the cell walls and thus make undesired electrical contact between the cells. In conventional designs of dunk-pile type batteries the creepage path is relatively short and its electrical resistance therefore relatively low; for, in the conventional batteries the electrolyte has to creep just over the very thin intercell walls 25 to make contact with the neighboring cells. Even if the cells are partly sealed in known manner the electrolyte will of course creep thru the relatively large openings which are provided in the cells for entrance of electrolyte and escape of air, and the creepage path will still be much less than the width of one cell.

I have found that intercell creepage may be eliminated or its effects greatly reduced by spatial alternation of cell openings in such a manner that the electrolyte is forced to creep at least over the width of one complete cell rather than just over the intercell walls. The pile type battery of Fig. 1 shows such spatial alternation of cell openings. The tops of the cells 1, 3, 5, 7, etc. are completely sealed, e.g., by a polyamide resin 26 or by any other electrolyte resistant material of dielectric properties. The bottoms of the cells 2, 4, 6, 8, etc. are sealed in the same way by polyamide resins 27. If now the battery according to the invention is saturated with electrolyte by dunking the creepage path will have the length of the full thickness of one cell. By thus increasing the length of the creepage path its electrical resistance is markedly increased and losses thru electrical leakage are greatly reduced.

As shown by the perspective view of a battery in Fig. 2 the spatially alternating openings are staggered in such a way that cell 1 has an opening 31 at its top, cell 2 has an opening 32 at its front side, cell 3 has an opening at its bottom and cell 4 has an opening at the rear side. (The openings of cells 3 and 4 are not visible in the drawing.) As can be plainly seen from the drawing the creepage paths will now be longer than the width of one cell; in fact, if creepage occurs over the tops of the cells the electrolyte will have to creep over the width of three cells to make electrical contact with another cell. For instance, creepage of electrolyte from cell 2 over the tops of the cells could make its first electrical contact with the opening of cell 6 only which of course would markedly increase the resistance of the leakage path if a continuous leakage should develop at all.

While the invention is described in connection with a specific electrochemical system it is obvious to those skilled in the art that other electrochemical systems may also be used for the purpose of the present invention. Similarly, the spatially alternating cell openings may be staggered in many different ways and the invention is not limited to the specific arrangement illustrated above.

What is claimed is:

In a dunk-pile type battery comprising a pile of thin, flat cell units each of said flat cell units comprising a negative electrode, a positive electrode, a spacer of bibulous electrolyte retaining material between said electrodes, conductive plates of liquid-tight material between the cell units and cell openings for the entrance of electrolyte during dunking characterized in that said cell openings are spatially staggered from one cell to the other in such a manner that groups of four neighboring cells show an opening in the top of the first cell, an opening in the front side of the second cell, an opening in the bottom of the third cell, and an opening in the rear side of the fourth cell.

References Cited in the file of this patent

UNITED STATES PATENTS

| Number | Name | Date |
|---|---|---|
| 1,213,182 | Gardiner | Jan. 23, 1917 |
| 2,349,763 | Setzer | May 23, 1944 |